(12) United States Patent
Nilsson et al.

(10) Patent No.: US 8,824,547 B2
(45) Date of Patent: Sep. 2, 2014

(54) VIDEO CODING USING A CONSTANT PERCEPTUAL QUALITY

(75) Inventors: Michael Erling Nilsson, London (GB); Rory Stewart Turnbull, London (GB); Christopher Mark Reason, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 13/977,215

(22) PCT Filed: Dec. 20, 2011

(86) PCT No.: PCT/GB2011/001745
§ 371 (c)(1),
(2), (4) Date: Jun. 28, 2013

(87) PCT Pub. No.: WO2012/089991
PCT Pub. Date: Jul. 5, 2012

(65) Prior Publication Data
US 2013/0279565 A1 Oct. 24, 2013

(30) Foreign Application Priority Data
Dec. 29, 2010 (EP) .................................. 10252239

(51) Int. Cl.
*H04N 7/26* (2006.01)
*H04N 7/40* (2006.01)

(52) U.S. Cl.
USPC ................................ 375/240.02; 375/240.03

(58) Field of Classification Search
None
See application file for complete search history.

(56) References Cited

U.S. PATENT DOCUMENTS

| 5,612,900 | A | * | 3/1997 | Azadegan et al. ............ 709/247 |
| 5,617,145 | A | * | 4/1997 | Huang et al. ............... 348/423.1 |
| 6,278,735 | B1 | | 8/2001 | Mohsenian |
| 2005/0084015 | A1 | * | 4/2005 | Han et al. ................. 375/240.19 |
| 2008/0260042 | A1 | | 10/2008 | Shah et al. |

(Continued)

FOREIGN PATENT DOCUMENTS

| WO | WO 2007/066066 | 6/2007 |
| WO | WO 2008/119954 | 10/2008 |
| WO | WO 2009/060178 | 5/2009 |
| WO | WO 2009/112801 | 9/2009 |

OTHER PUBLICATIONS

International Search Report for PCT/GB2011/001745, mailed Apr. 4, 2012.

(Continued)

*Primary Examiner* — Behrooz Senfi
*Assistant Examiner* — Mohammed Jebari
(74) *Attorney, Agent, or Firm* — Nixon & Vanderhye, P.C.

(57) ABSTRACT

Methods and apparatus for video coding are disclosed, particularly for use in relation to video compression. Many commercially available video encoders support constant bit-rate encoding but not constant quality encoding. Aspects of the present invention are concerned with methods and apparatus for video coding, the methods involving the determination of bit-rates at which a constant bit-rate encoder may be operated such that segments of video can be chosen from files encoded at the bit-rates so-determined in order to produce an output bitstream in which the quality is nearly constant. Bit-stream segments may be chosen from a low bit-rate bitstream for easy-to-compress scenes, and from a high bit-rate bitstream for hard-to-compress scenes.

11 Claims, 7 Drawing Sheets

(56) References Cited

U.S. PATENT DOCUMENTS

2009/0219993 A1 9/2009 Bronstein et al.
2009/0279605 A1 11/2009 Holcomb et al.
2010/0080290 A1 4/2010 Mehrotra
2010/0246677 A1* 9/2010 Nilsson .................... 375/240.14

OTHER PUBLICATIONS

EP Search Report for EP Application No. 10252239, dated Jun. 16, 2011.
Zhang, D. et al., "A two-pass rate control algorithm for H.264/AVC high definition video coding", Signal Processing, Image Communication, vol. 24, No. 5 (May 1, 2009), pp. 357-367.
Crabtree, B. et al., "Equitable Quality Video Streaming Over DSL", printed on Jun. 27, 2013, 8 pages.
Zhang, Dongdong et al. "A two-pass rate control algorithm for H.264/AVC high definition video coding", Department of Computer Science, Tongi University, Shanghai, China; Department of Electronic Engineering, The Chinese University of Hong Kong, China; School of Electrical and Electronic Engineering, Nanyang Technological University, Singapore, Signal Processing: *Image Communication* 24 (2009) pp. 357-367.
Office Action (2 pgs.) dated Dec. 3, 2013 issued in corresponding Japanese Application No. 2013-546762 with an at least partial English-language translation thereof (2 pgs.).

* cited by examiner

VIDEO CODING USING A CONSTANT PERCEPTUAL QUALITY

This application is the U.S. national phase of International Application No. PCT/GB2011/001745, filed 20 Dec. 2011, which designated the U.S. and claims priority to EP Application No. 10252239.8 filed 29 Dec. 2010, the entire contents of each of which are hereby incorporated by reference.

TECHNICAL FIELD

The present invention relates to video coding. More specifically, aspects of the invention relate to methods and apparatus for video coding. Preferred embodiments are concerned with video compression, and in particular the encoding of video at "near-to-constant" perceptual quality.

BACKGROUND TO THE INVENTION AND PRIOR ART

Encoded video naturally has variable bit-rate (VBR), as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit-rate (CBR) encoding is used, video has to be coded at time varying quality to meet the bit-rate constraint. This has been shown to be sub-optimal to the user, who would prefer to see constant quality. Also, by fixing the bit-rate independent of the genre of the video content, some genres of content can be encoded well, such as news and drama, whereas others, such as fast moving sport and music videos and concerts, can only be coded quite poorly.

The overall perceptual quality of a video sequence is not (generally) the mean of the quality of individual small chunks of the overall video sequence, but is biased towards the worst quality observed during the overall video sequence or parts thereof. Hence by encoding with near-constant quality (as opposed to encoding with a constant bit-rate sufficiently high to ensure that all scenes are encoded so as to be at or above a particular perceptual quality level), bits are not wasted encoding some scenes to a higher quality than necessary given the quality at which other scenes may be encoded, and a smaller overall encoded file size can be achieved compared to using constant bit-rate encoding.

Encoding with constant perceptual quality is, however, not widely supported by commercial video encoding platforms, which generally support constant bit-rate encoding.

PRIOR ART

International patent application WO2009/112801 ("Nilsson") describes a method of encoding with constant perceptual quality. Pictures are coded using a coding algorithm with a variable parameter so that the quality of the coding varies. Summarising this method in more detail, a target value is first specified for a quality measurement parameter. Then, for each picture (or part of a picture) to be coded, an estimate is made, independently of the other pictures, of a value for a variable parameter QP based on a) the target value for that picture area and b) a masking measure C that depends on the picture content of that picture area. The picture is then coded using the estimated value. The masking measure may be compensated to allow for the effect of the coding quality upon the masking effect.

International patent application WO2009/060178 ("Nilsson") describes a method of selecting chunks of video from multiple encoded video streams to produce a single video stream with near constant perceptual quality, that can be transmitted at constant bit-rate with a specified client video buffer size. It will be noted that this document is concerned with selecting between encoded bitstreams to meet a buffer constraint when transmitting at constant bit-rate.

United States patent application US2008/260042 ("Shah et al") describes techniques intended to control a perceived quality of multimedia sequences to try to achieve a desired constant perceptual quality regardless of the content of the sequences. In particular, an encoding device may implement quality control techniques to associate a sequence segment with a content "class" based on the content of the segment, then determine a perceptual quality metric of the sequence segment, and adjust at least one encoding parameter used to encode the segment such that the perceptual quality of the sequence segment converges to the desired quality.

Referring briefly to other cited prior art, Dongdong Zhang et al: "A Two-Pass Rate Control Algorithm for H.264/AVC High-Definition Video Coding" (Signal Processing: Image Communication, vol. 24, no. 5 (1 May 2009), pages 357-367) relates to a two-pass rate control algorithm which aims to achieve constant quality encoding for H.264/AVC high definition video coding.

U.S. Pat. No. 6,278,735 ("Mohsenian") relates to a real-time single-pass variable bit-rate control strategy and encoder. It is concerned with encoding with a single pass, and in particular with determining in advance a target number of bits for each group of frames.

Various currently-available Internet Protocol television (IPTV) services such as BT Vision use constant bit-rate encoding and bandwidth reservation on the network. It appears likely that future versions of such services will allow more flexibility, including abandoning bandwidth reservation and providing the possibility of encoding at bit-rates other than constant bit-rate. The use of encoding with near-constant perceptual quality should allow encoded file-sizes to be reduced while maintaining perceptual quality targets, and in turn may reduce content delivery costs, especially if these are dependent on byte volume.

SUMMARY OF THE INVENTION

According to a first aspect of the present invention, there is provided a method of video coding, comprising:
(a) obtaining a video sequence encoded at one or more initial constant bit-rates;
(b) dividing the encoded video sequence into temporal portions;
(c) analysing respective temporal portions whereby to determine, in respect of each of a plurality of said temporal portions, a constant bit-rate at which said temporal portion could be encoded such as to meet a predetermined perceptual quality requirement;
(d) partitioning the range of constant bit-rates so-determined into a plurality of sub-ranges, each sub-range having a selected one of a plurality of different bit-rates associated therewith;
(e) assigning respective temporal portions to one of said sub-ranges such that said temporal portions, if encoded at the bit-rate associated with the sub-range to which they are assigned, would meet said predetermined perceptual quality requirement;
(f) establishing, in respect of said sequence, a first bit-count measure indicative of an amount of data that would be required for said temporal portions to be encoded respectively at the bit-rates of the sub-ranges to which they have been assigned, and a second bit-count measure indicative of an amount of data that would be required for said temporal portions each to be encoded at bit-rates sufficient to match a constant perceptual quality requirement;

(g) determining a difference measure indicative of a level of disparity between said first bit-count measure and said second bit-count measure;

(h) re-partitioning the range of constant bit-rates at least once using an updated set of bit-rates such that at least one sub-range has a different bit-rate associated therewith, said updated set of bit-rates being such that a subsequent performance of steps (e), (f) and (g) would result in determination of a difference measure indicative of a decrease in said disparity; and (i) creating an output video sequence comprising temporal portions respectively encoded at different bit-rates from said updated set of bit-rates.

The video sequence may be received already encoded at the initial constant bit-rate or bit-rates, or it may be received and then be encoded whereby to obtain the video sequence encoded at the initial constant bit-rate or bit-rates.

According to preferred embodiments, the video sequence obtained may initially be encoded at a single predetermined initial constant bit-rate. It may, for example, initially be encoded at a maximum rate at which content may be encoded for a given video service—this may be done in order to allow the initial constant bit-rate encoding to serve as the highest of the constant bit-rate encodings which may eventually be used in the creation of the output video sequence.

Alternatively, the video sequence obtained, or portions thereof, may initially be encoded at different initial constant bit-rates, Respective portions of the video sequence obtained may for example be identified as having different characteristics (using known video analysis techniques or otherwise), and may then be encoded at different initial constant bit-rates, the initial bit-rates for respective portions being determined in dependence on the respective characteristics identified in respect thereof. The "characteristics" may relate to, result from, or be chosen to be indicative of different "genres" of video content, such as news, drama, sport, music videos and concerts, etc., and may allow different portions of the overall video sequence to be treated separately, using appropriately-selected different initial encodings.

According to preferred embodiments, the or each step of re-partitioning the range of constant bit-rates may be performed such that the updated set of bit-rates includes the initial constant bit-rate, or if more than one may have been used, at least one of the (one or more) initial constant bit-rates. This may make the overall processing more efficient, as the initial encoding or encodings may then be used in the creation of the output video sequence. In such embodiments, re-partitioning the range of constant bit-rates may comprise a step of identifying an optimal number of sub-ranges having bit-rates greater than a particular one initial constant bit-rate associated therewith, and an optimal number of sub-ranges having bit-rates lower than said at least one initial constant bit-rate associated therewith.

Preferably, the number of constant bit-rates used for encoding is between two and ten, and is preferably about four.

According to certain embodiments, re-partitioning the range of constant bit-rates may involve partitioning the range of constant bit-rates into a different number of sub-ranges than the number originally used, each sub-range having a selected one of a plurality of different bit-rates associated therewith. This may be done if, for example, the original number chosen (four, for example) is found not to be leading to the termination criteria being satisfied, or is found not to be leading quickly enough to the termination criteria being satisfied. A higher number of sub-ranges (six, or eight, for example) may then be used when continuing with the procedure, in order that further iterations may then lead (more quickly) to the termination criteria being met.

According to certain embodiments, the constant bit-rates used for encoding may be limited by a predetermined maximum bit-rate. This may be done for such a reason as being able to deliver the content, starting at any point in the content (often known as random access), while constraining the delivery bit-rate required to the said maximum bit-rate, or for other reasons.

Other aspects of the present invention relate to apparatus and to computer programs for carrying out the method of the first aspect, and to carrier means, most preferably tangible carrier means such as a magnetic or optical disk (e.g. a hard drive or a CD ROM or DVD, etc.), or disks, or a solid state memory device or devices, carrying such programs.

The various options and preferred embodiments referred to above in relation to the first aspect are also applicable in relation to these other aspects.

As set out in the "Abstract" of the present document, methods and apparatus for video coding are disclosed herein, particularly for use in relation to video compression. While many commercially available video encoders support constant bit-rate encoding, they generally do not support constant quality encoding. Aspects of the present invention are concerned with methods and apparatus for video coding, the methods involving the determination of bit-rates at which a constant bit-rate encoder may be operated such that segments of video can be chosen from files encoded at the bit-rates so-determined in order to produce an output bitstream in which the quality is nearly constant, without encoding unnecessarily large amounts of video at unnecessarily high bit-rates. Bitstream segments may be chosen from a low bit-rate bitstream for easy-to-compress scenes, and from a high bit-rate bitstream for hard-to-compress scenes.

Referring again briefly to WO2009/060178, discussed earlier, it will be noted that this is concerned with selecting between encoded bitstreams to meet a buffer constraint when transmitting at constant bit-rate, whereas preferred embodiments of the present invention are concerned with selecting bit-rates at which to operate constant bit-rate encoding.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

With reference to FIGS. 1 to 11, a method and apparatus for video coding according to a preferred embodiment will be described. Firstly, however, some relevant concepts will be summarised briefly.

As explained earlier, encoded video naturally has variable bit-rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality.

The overall perceptual quality of a video sequence is not the mean of the quality of small chunks of the video, but is biased towards the worst quality observed. Hence by encoding with near-constant quality, bits are not wasted encoding some scenes to a higher quality than necessary given the quality at which other scenes may be encoded, and a smaller overall encoded file size can be achieved compared to using constant bit-rate encoding.

As indicated earlier, the present inventors have realised that encoding with constant perceptual quality is, however, not widely supported by commercial video encoding platforms, which generally support constant bit-rate encoding. Preferred embodiments of the present invention are concerned with encoding content at a number of constant bit-rate values, analysing the statistics of the encodings, and creating a near-constant quality video stream by selecting chunks of video from the video streams encoded respectively at constant bit-rates. In particular it is concerned with the selection of bit-rates to use with constant bit-rate encoding, generally given a constraint on the number of such encodings, such as to lower or minimise the size of the eventual near-constant quality encoded file while ensuring each chunk of video is coded at a target quality level or better.

Figure 1:
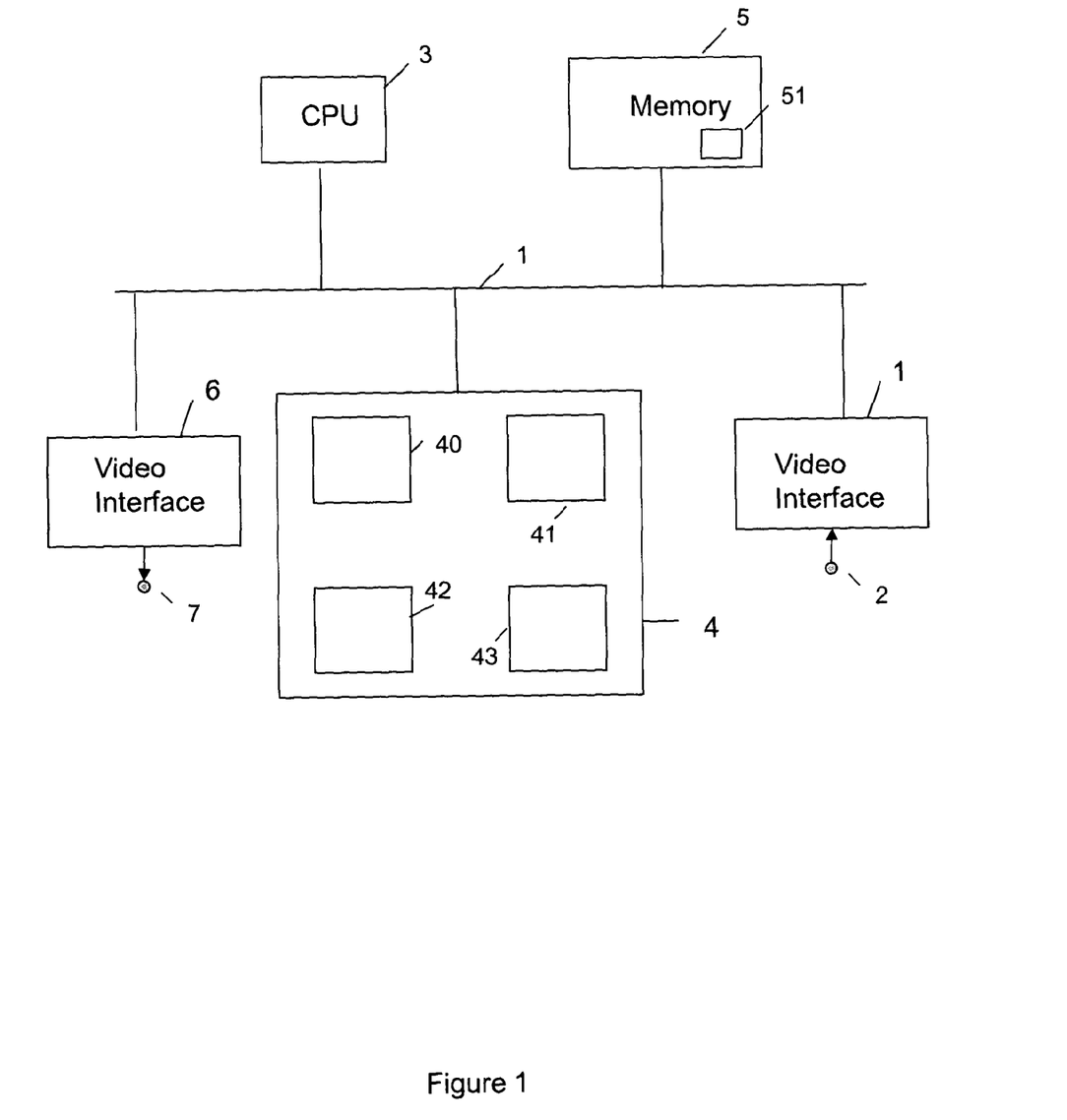
FIG. 1 is a block diagram of a video coder.

Referring now to FIG. 1, the apparatus shown comprises a video interface 1 that receives digitally coded video signals, in uncompressed form, at a video input 2. A processor 3 operates under control of programs stored in disc storage 4 and has access to memory 5 and a video output buffer 6 that feeds a video output 7. The memory 5 includes a memory area 51 for temporary storage of picture parameters. The programs include a general purpose operating system 40 and video coding software which implements one of more of the coding methods shortly to be described. This software comprises several programs (or groups of programs), namely:

control software 41;
compression software 42: in this example the compression software implements a coding algorithm compliant with the ITU H.264 standard; and
perceptual quality evaluation software 43.

Figure 2:
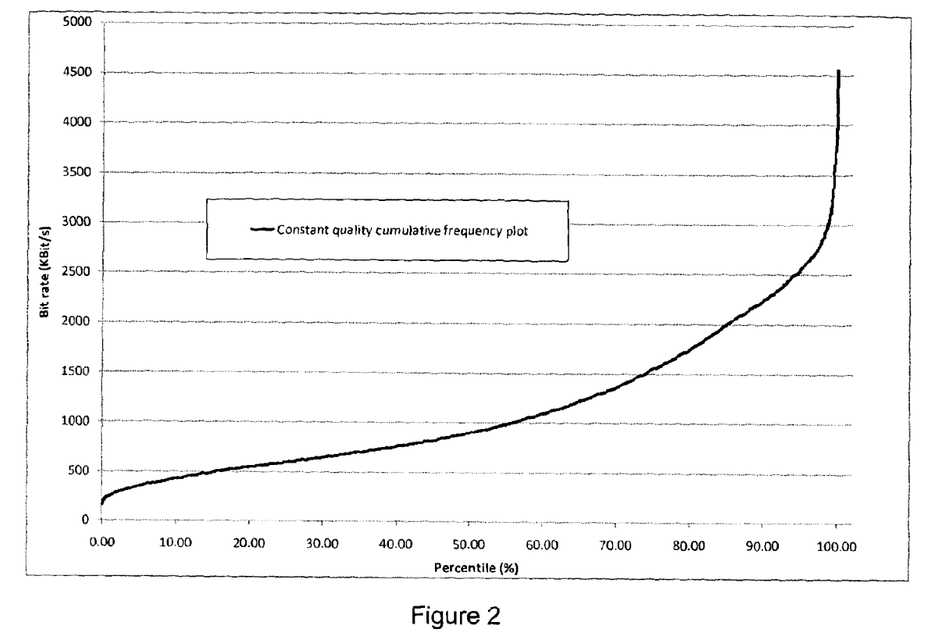
FIGS. 2 to 10 are graphs illustrating the derivation of certain parameters.

FIG. 2 shows the results from encoding a video sequence at a constant quality, equal to 4.0, which is "good" quality. For the purposes of this example, the encoding is done using the constant perceptual quality encoding technique described in WO2009/112801 referred to earlier, the contents of which is incorporated herein by reference, but it will be understood that this is only one of a number of possible techniques for encoding with constant perceptual quality that may be used. The quality of the video is then measured, in this example using the metric described in International patent application WO2007/066066 ("Davis"), the contents of which is incorporated herein by reference, although it will again be understood that other techniques for measuring video quality may of course be used.

Briefly summarising WO2007/066066 for convenience, this relates to a video quality measurement technique for use particularly where a video signal has an 'original form' representative of a plurality of frames, an 'encoded form' in which the video signal has been encoded using a suitable compression algorithm utilising a variable quantiser step size such that the encoded signal includes a quantiser step size parameter, and a 'decoded form' in which the encoded video signal has been at least partly re-converted to the original form. The technique of WO2007/066066 comprises: a) generating a first quality measure which is a function of the quantiser step size parameter; b) generating a second quality measure which is a function of the spatial complexity of the frames represented by the video signal in the decoded form; and, c) combining the first and second measures.

Returning now to FIG. 2, once the video sequence has been encoded (using a technique such as that set out in WO2009/112801, for example), and once a quality metric has then been determined (using a technique such as that set out in WO2007/066066, for example), the number of bits used to encode each group of pictures, being (in this example) 24 frames starting with an "Intra" coded frame (i.e. an "I-Frame"), is determined. These bit-counts are then sorted from lowest to highest to produce the cumulative frequency curve shown in FIG. 2. While it should be borne in mind that the graph shows a constant quality "cumulative frequency" plot, and that the x-axis therefore represents "cumulative frequency" on a scale of 0-100% (as opposed to simply representing "frequency"), the x-axis can be thought of as signifying the 'variability' of the video content of a group of pictures making up a chunk of video, where 'variability' indicates the amount of spatial change, change in chrominance and/or change in intensity that occurs over time during the chunk in question. It therefore ranges from simple, still images (which would be represented at or near the 0% end of the range) and which are easy to compress, to highly complex scenes containing rapid movement and large changes in chrominance and/or intensity (which would be represented at or near the 100% end of the range), which are hard to compress.

It can be seen that the bit-rate required by groups of pictures varies from 153 KBit/s to 4551 KBit/s with a median value of 900 KBit/s.

This curve has of course been produced by the analysis of a bitstream generated by an encoder operating in a constant quality encoding mode of operation. As indicated earlier, these have not been widely implemented in the industry, whereas constant bit-rate encoding is widely deployed. Hence we aim to produce a near-constant quality encoded bitstream by combining chunks of data from bitstreams generated by encoding the same video content (or portions thereof) at different constant bit-rates. Clearly to get completely constant quality we would need to encode the video content at as many constant bit-rate levels as there are chunks of data in the video content, as each chunk would require a different bit-rate to achieve exactly the same quality. This in general is not practical. Instead, we limit the number of constant bit-rate levels to a reasonably low number, which will be at least two, and in this example, will be four. The following discussion will explain how we propose to solve the problem of how to determine the values of those constant bit-rate levels so as to be able to represent each chunk of video at a quality level no lower than the target constant quality level, while lowering or minimising the amount of data in the eventual encoded near-constant quality video file.

We will now describe one algorithm for determining such constant bit-rate levels.

Figure 3:
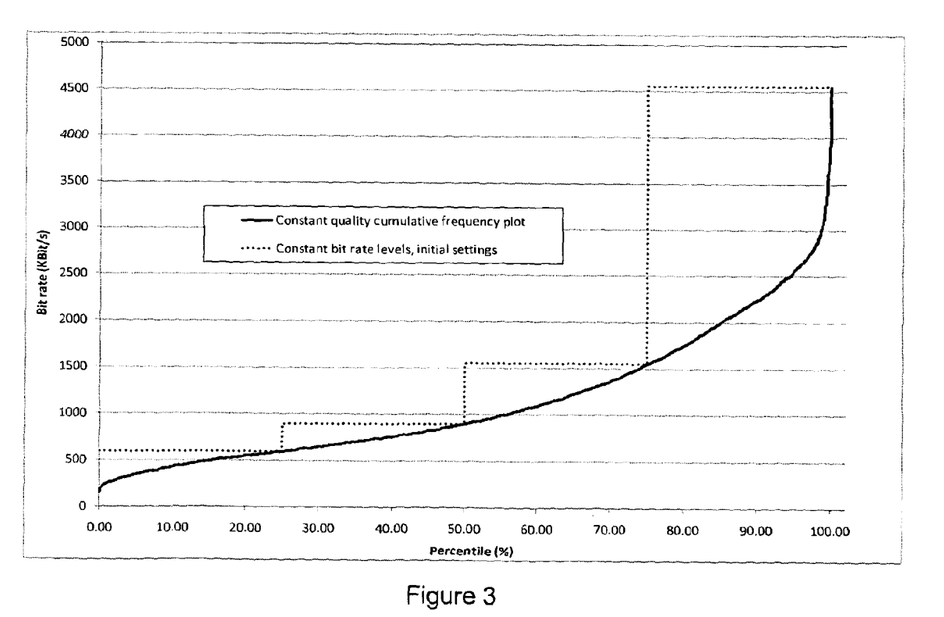

We firstly select the number of constant bit-rate levels that we shall use. As mentioned above, in this example it is four, this number being selected for convenience, as it provides a reasonable level of flexibility without placing particularly high processing demands on the system or adding unnecessary levels of complexity. (The number of levels may theoretically be as small as two, but would preferably be greater than two). We then partition the cumulative plot of FIG. 2 into this number of sections along the horizontal axis, and identify the highest bit-rate needed for each section so as to achieve the desired target quality. As the data has already been sorted in order of increasing bit-rate requirements, the identified constant bit-rate levels are the values of bit-rate (i.e. the vertical axis) on this cumulative frequency curve at the right-hand end of each section. The constant bit-rate levels selected in this way, and the chunks of video to which they apply to achieve the desired target quality are shown in FIG. 3 (from which it can be seen that the initial constant bit-rate levels so-selected are 595 KBit/s, 900 KBit/s, 1553 KBit/s and 4551 KBit/s respectively—the exact values are in fact taken from Table 1, which appears and is discussed later).

There are clearly other algorithms for finding a solution to this problem of finding the constant bit-rate levels to minimise the area between the curves—other embodiments may use such other algorithms.

Figure 4:
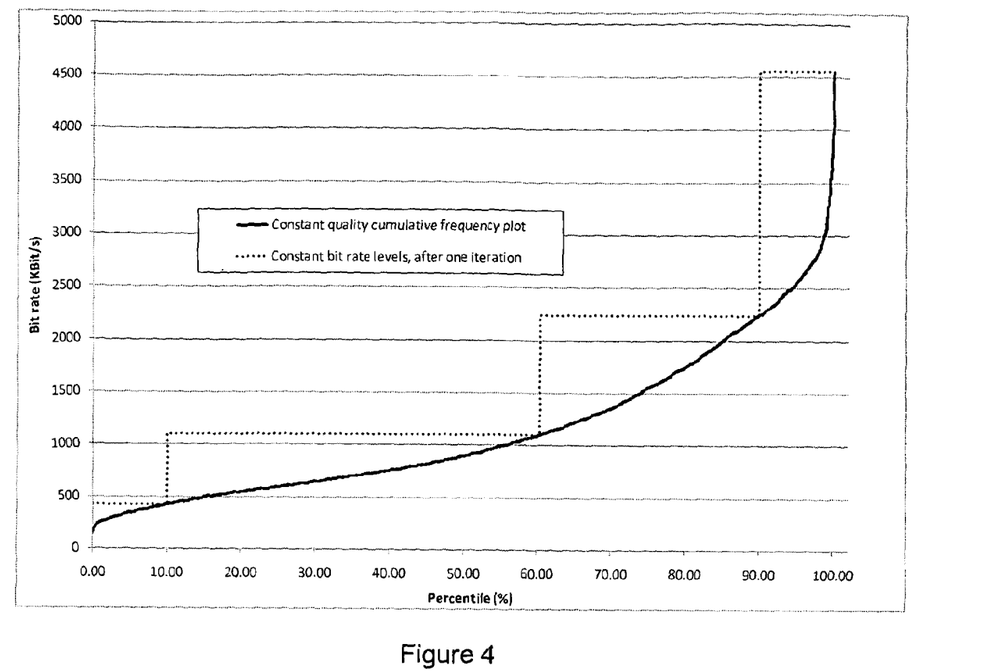
Figure 5:
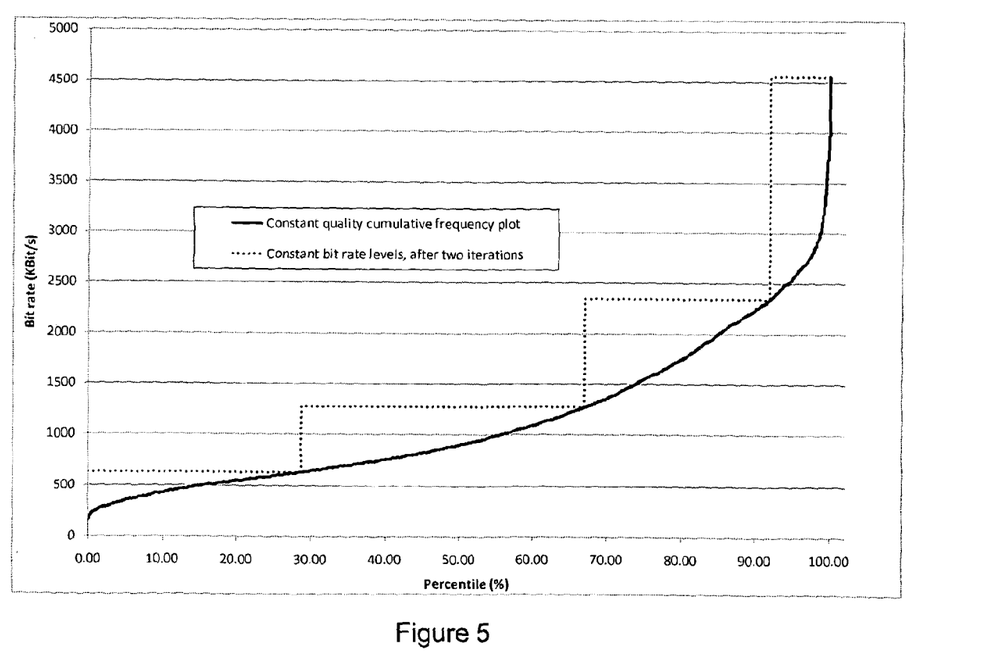

FIG. 4 shows the result of one iteration of this algorithm, and FIG. 5 shows the result of two iterations of this algorithm. It will be evident from these graphs alone that with each successive iteration, the sum of the four areas (representing the 'wasted' bit-rate) is decreasing.

Table 1 below shows the constant bit-rate levels (in KBit/s), the area associated with each such level and the total area (both in MByte), and the percentage saving relative to the initial setting, with the initial settings and after each of four iterations of the above algorithm.

TABLE 1

|  | Initial settings | | After 1 iteration | | After 2 iterations | | After 3 iterations | | After 4 iterations | |
| --- | --- | --- | --- | --- | --- | --- | --- | --- | --- | --- |
|  | Bit-rate | Area | Bit-rate | Area | Bit-rate | Area | Bit-rate | Area | Bit-rate | Area |
| Area 1 | 595 | 233 | 428 | 56 | 632 | 295 | 747 | 540 | 799 | 675 |
| Area 2 | 900 | 259 | 1104 | 1197 | 1276 | 913 | 1398 | 759 | 1457 | 704 |
| Area 3 | 1553 | 590 | 2238 | 1198 | 2342 | 913 | 2423 | 759 | 2454 | 704 |
| Area 4 | 4551 | 3705 | 4551 | 1198 | 4551 | 914 | 4551 | 760 | 4551 | 705 |
| Total |  | 4787 |  | 3648 |  | 3034 |  | 2818 |  | 2788 |
| % Saved |  | 0.00 |  | 23.79 |  | 36.63 |  | 41.14 |  | 41.75 |

We observe that for any particular chunk of video, the bit-rate used in constant bit-rate encoding is at least that required for constant quality encoding, with the vertical distance between the two curves being representative of the additional bit-rate required for constant quality encoding. Note that this additional bit-rate could be considered to be 'wasted' as it results in encoding the particular chunk of video at a quality above the target quality, and that such an increase in quality is deemed not necessary. Hence we consider the area between the two curves (i.e. above the "unbroken" curve but below the "stepped dotted-line" curve) to be representative of the total 'wasted' bit-rate when using constant bit-rate encoding.

In order to minimise this waste, we therefore need to minimise the area between the two curves.

We attempt to do this by firstly measuring the total area between the curves (i.e. in this example, summing the four separate areas), then dividing this total area by the number of constant bit-rate levels (i.e. four in this example) to get an area fraction. Next, starting at the high bit-rate end, we allocate or designate (by tagging or otherwise) chunks of video to constant bit-rate levels until the area associated with each constant bit-rate level is greater than or equal to the area fraction. The first constant bit-rate level so determined must be equal to the highest bit-rate required for any chunk observed in the video sequence (i.e. in this example, 4551 KBit/s). The succeeding constant bit-rate levels are determined as the highest bit-rate for a chunk not already associated with a constant bit-rate level. In general, the area associated with the lowest constant bit-rate level (i.e. in FIG. 3, the area between the curves in the 0-25% range) is less than the area fraction, and hence in practice we have not—in a single iteration—equalised the area associated with each constant bit-rate level. Hence we iterate until the area associated with each constant bit-rate level meets predetermined "termination criteria" which, when met, indicate that the area is equal within a predetermined tolerance.

There are of course many possible iteration termination criteria which may be used. One preferred criterion is to stop after an iteration causes the total area to increase and to stop when the percentage reduction in total area increases by less than a predetermined threshold, such as 1%. Alternatively it would be possible to terminate when Area 1 is within a given tolerance of the other areas, for example, when it is within 5% of the other areas.

In this example, we terminate after four iterations, and select the rates 799 KBit/s, 1457 KBit/s, 2454 KBit/s and 4551 KBit/s for constant bit-rate encoding.

Constant Bit-Rate Encoding

In the above example, we firstly used the statistics of a constant quality encoding to determine the cumulative frequency curve of bit-rate required for constant quality encoding, and then calculated appropriate constant bit-rate levels that could be used to create a near-constant quality encoding while minimising the wasted bit-rate.

In practice, however, we would only desire to perform constant bit-rate encoding to create a near-constant quality encoding when no such constant quality encoding could be achieved by another process, such as using an encoder configured to encode with constant quality.

In view of the above, we now describe a process according to a preferred embodiment which avoids the need to encode with constant quality in the first place.

We firstly encode with a pre-determined constant bit-rate level. This could be the same bit-rate for each piece of video content encoded, or could be different for each piece of video content encoded, for example being determined by the genre of the content. The bit-rate chosen may also be a maximum rate at which content would be encoded for a given video service.

In this example we encode at 2 MBit/s. We then analyse the quality of each group of pictures in the encoded video, and determine the bit-rate used, which we expect to be mostly constant. We also calculate the average quality, for each group of pictures (determined in this instance by applying the metric defined in WO2007/066066, for example), to each individual coded frame, and averaging the resulting values over the group of pictures. We also record the average quantisation parameter used to encode the group of pictures, and the average contrast of the group of pictures, being a measure of the spatial complexity of the group of pictures, both being parameters required if calculating the metric using the technique of WO2007/066066.

We select a target quality, at or above which we wish to encode all of the content. In this example we choose the value 4.0, which corresponds to "good" quality. We then estimate, using the calculated parameters of the constant bit-rate encoding, the bit-rate that would have been required to encode each group of pictures at the target quality. We do this as follows.

WO2009/112801 describes techniques by which it is possible to determine the average quantisation parameter required to achieve a given target quality when the average contrast is known, by identifying a quadratic approximation to a quality metric such as may be determined using a technique such as that set out in WO2007/066066, and solving the quadratic for average quantisation parameter. Such techniques as those described may be used in relation to the present embodiments in order to determine the average quantisation parameter required, but it will be understood that embodiments of the invention are not limited to those using such techniques—other techniques may also be used, of course.

The quadratic approximation to the quality metric of WO2007/066066 is as follows, where Q is the average quantisation parameter and C is the average contrast.

This can be solved by the known methods of solving quadratic equations, giving the solution below for the average quantisation index that would be needed to achieve the target quality given the average contrast.

$$Q = \frac{\left(0.174177 + \sqrt{(0.174177)^2 - 4 \times 0.00503 \times (\text{quality} - 2.649382 - 0.072 \times C)}\right)}{(2 \times 0.00503)}$$

We then calculate an estimate for the bit-rate that would have been needed to encode with this value of quantisation parameter. We note that it is well known that bit-rate varies with quantisation parameter approximately according to the following equation, when encoding with H.264. Other equations apply when encoding with other video coding standards, and the corresponding equations are also well known.

$$bit_{rate_2} = bit_{rate_1} \times 2^{\frac{Q_1 - Q_2}{K}}$$

The parameter K varies with content type and to some extent with quality, and is usually in the range 4.0 to 5.0. In this example we set K=4.4.

Hence we can estimate, from the constant bit encoding, the number of bits required to encode each group of pictures in the sequence at constant quality. We can then proceed as in the original case of having an actual constant quality encoding by sorting the groups of pictures in order of the estimated number of bits required to encode them at constant quality, from lowest to highest, and plotting a cumulative frequency distribution.

Figure 6:
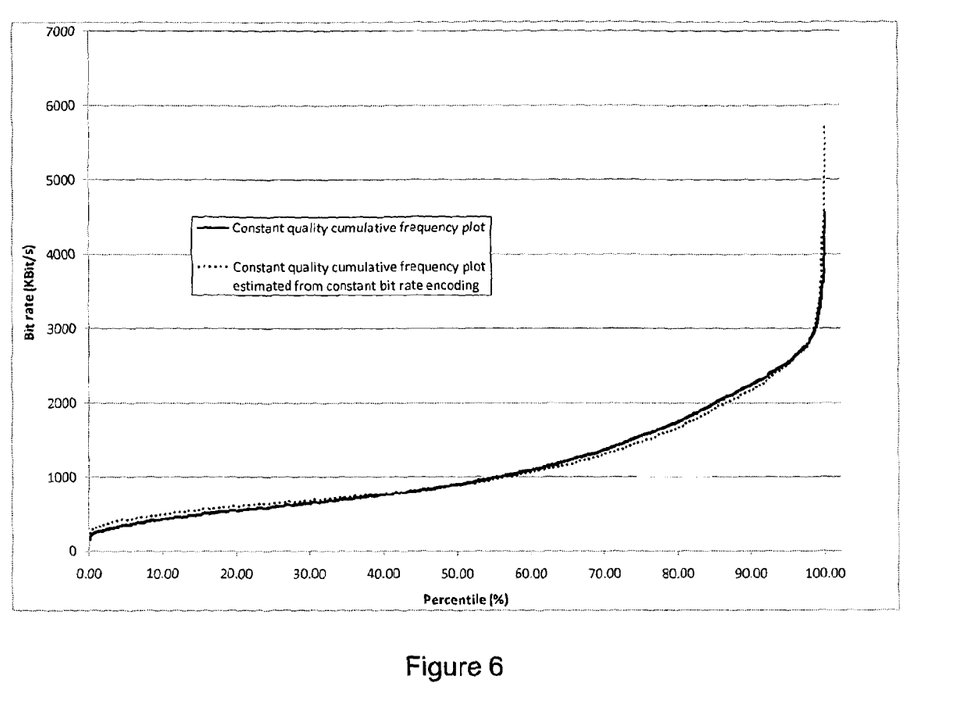

FIG. 6 shows the cumulative frequency distribution for the original constant quality encoding and the estimated cumulative frequency distribution derived from analysis of a constant bit-rate encoding.

It can be seen that the estimated constant quality cumulative frequency is very close to the actual curve, and hence is well suited for the selection of constant bit-rate levels for encoding with constant bit-rate.

Note that while the above process for estimating the bit-rate required for a given group of pictures when encoded with a modified quantisation index may frequently give an inaccurate result, when the results of many groups of pictures are considered together, the overall result is much improved.

The estimated constant quality cumulative frequency curve can then be used to calculate constant bit-rate encoding levels as previously described. If this is carried out exactly as described earlier, then it is likely that the bit-rate at which the content has already been encoded, for the purposes of estimating the constant quality cumulative frequency curve, will not be one of the selected rates. In some cases this may be acceptable, while in others it may be desirable to make use of this as one of the constant bit-rate encoding levels.

In this case the procedure can be modified as follows.

As before, we firstly select the number of constant bit-rate levels that we shall use. In this example it is again four. We then divide the cumulative plot above into two sections at the point at which the bit-rate is that used in the original constant bit-rate encoding.

Figure 7:
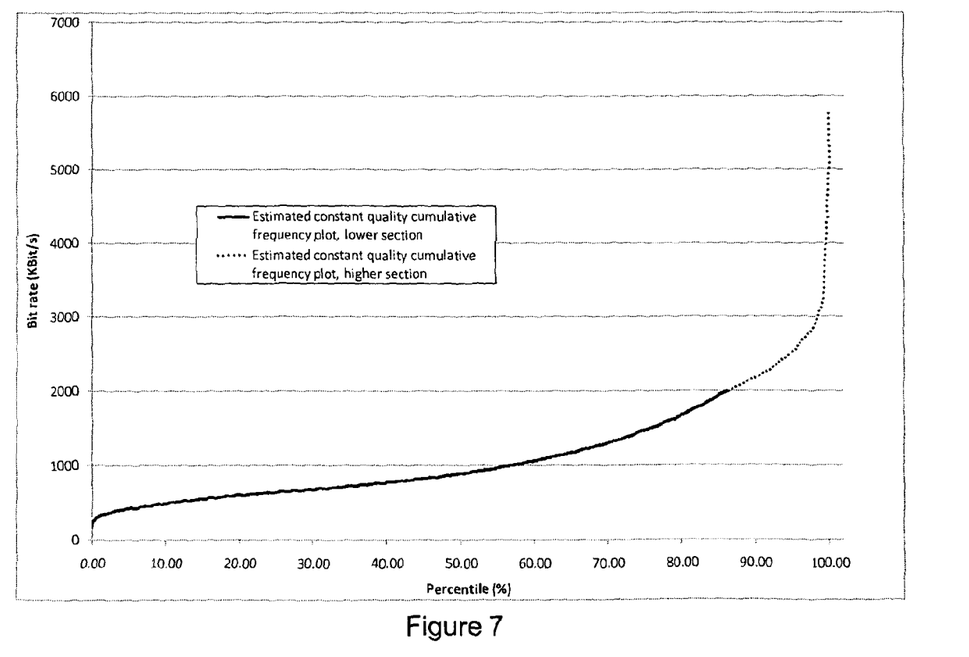

This is shown in FIG. 7, where the part of the curve below the bit-rate, 2 MBit/s, used in the original constant bit-rate encoding is shown as a solid line and the part of the curve above the bit-rate used in the original constant bit-rate encoding is shown as a dotted line.

We then process each of the two curve segments as we described earlier for the whole curve, with an additional iteration required as we do not know the optimal number of constant bit-rate encoding levels for each line segment: we only know the total. Hence we iterate over all possible numbers of constant bit-rate encoding levels for each line segment. In this example we would try three levels for the first segment and one for the second, then two for each and finally one for the first and three for the second. We would choose the solution that gave the lowest total area.

In another application scenario we may wish to limit the maximum bit-rate used as a constant bit-rate encoding level, for reasons including being able to deliver the content, starting at any point in the content (often known as random access), while constraining the delivery bit-rate required to the said maximum bit-rate.

In such a case it may be practical to perform the initial encoding at this maximum bit-rate. Groups of pictures that are coded at a lower quality than the target quality at this bit-rate will be encoded at this lower quality in the final 'near-constant' quality encoded file. Other groups of pictures will be coded at or above the target quality.

Figure 8:
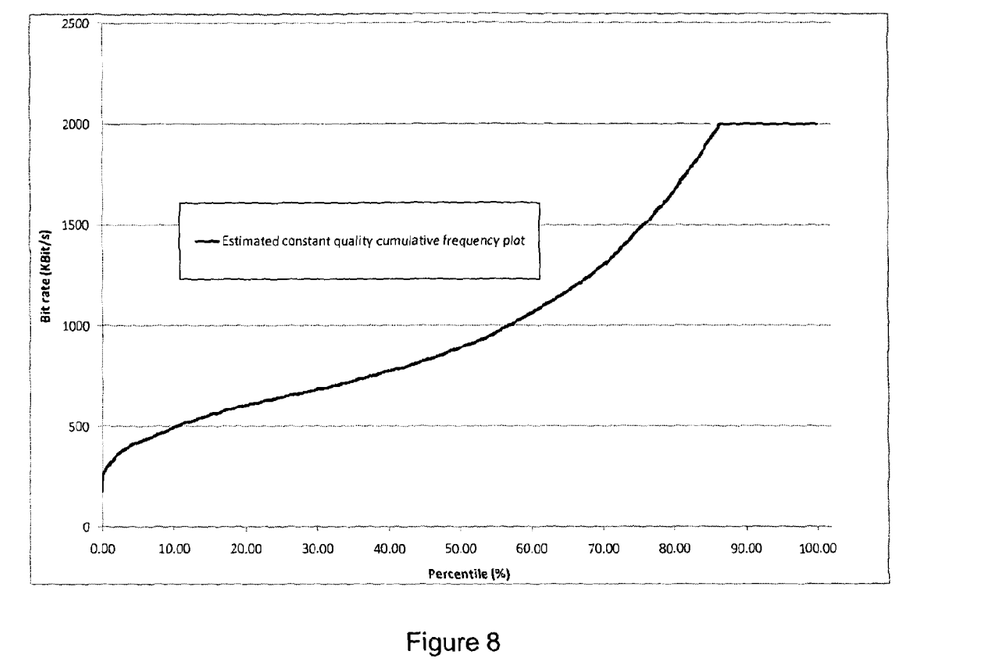

In this case we do not need to estimate the bit-rate required for groups of pictures that are coded at a lower quality than the target quality in this first encoding, as it is this bit-rate that will be used to encode those groups of pictures. Hence we can either terminate the constant quality cumulative frequency curve at the bit-rate used in the initial encoding, in which case it would be the solid curve from the figure above, and process it as described earlier to find the constant bit-rate encoding levels; or we could clip the bit-rate on the constant quality cumulative frequency curve at the bit-rate used in the initial encoding and allow the curve to continue over all groups of pictures, as shown in FIG. 8, and process it as described earlier to find the constant bit-rate encoding levels.

We will now describe an example where we select constant bit-rate encoding levels for bit-rates both above and below the bit-rate used in the original constant bit-rate encoding.

As described above, we consider three cases: 1) three constant bit-rate levels for the first segment and one for the second; 2) two constant bit-rate levels for each segment; and 3) one constant bit-rate level for the first segment and three for the second.

Figure 9:
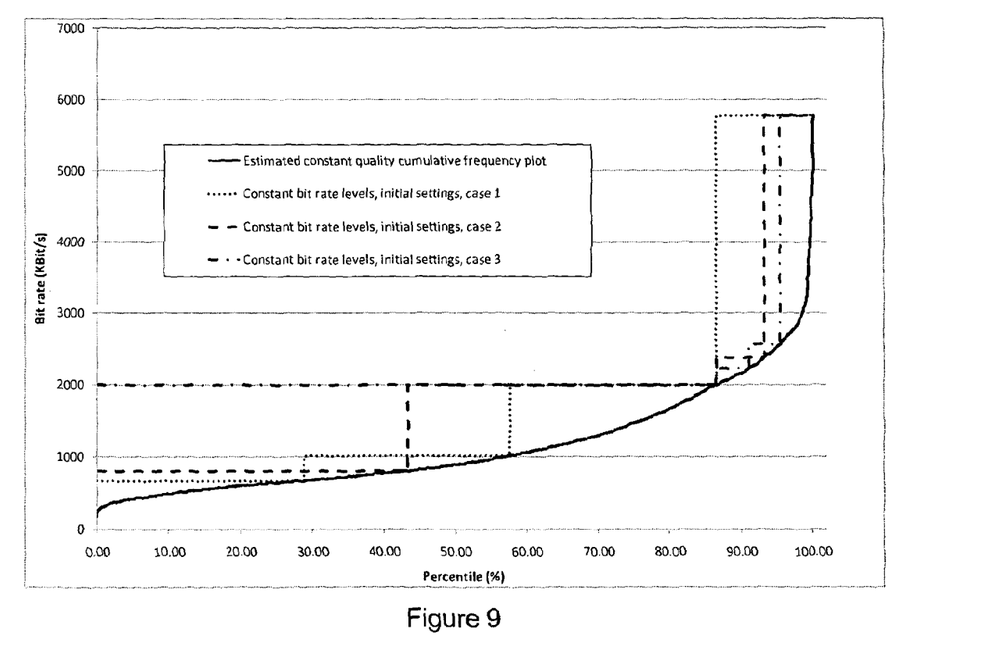

FIG. 9 shows the initial settings of constant bit-rate level for each of the three cases, where the horizontal range of each segment has been divided up into equal percentiles, with the divisor being the number of constant bit-rate levels for the segment.

Figure 10:
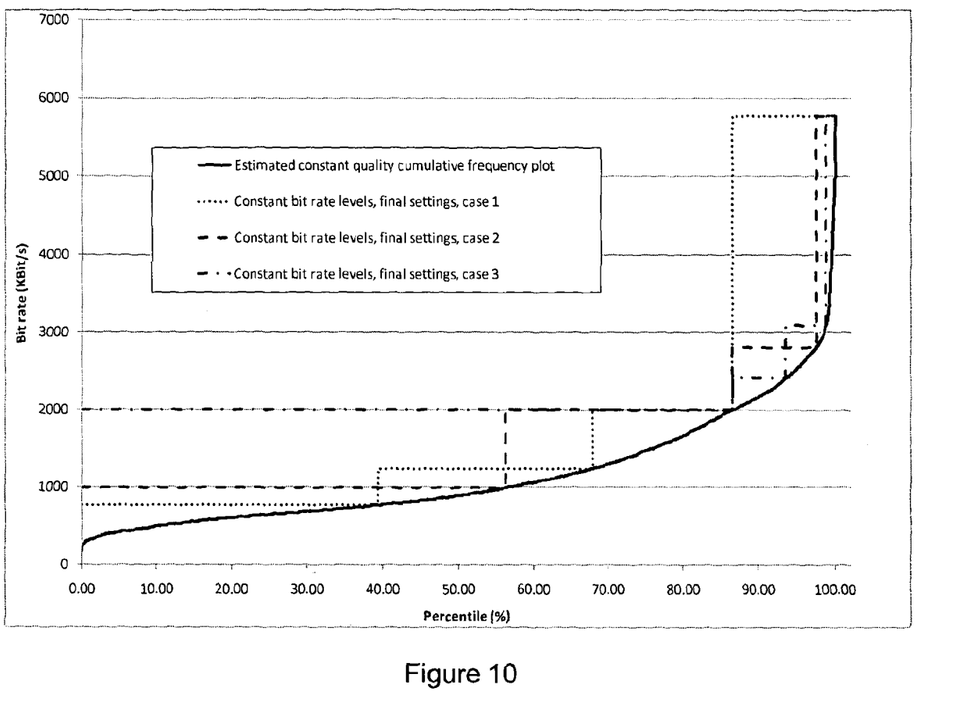

FIG. 10 shows the selected constant bit-rate levels for each of the three cases after the iteration process has been terminated for each case.

The tables below indicate the selected bit-rates and the associated areas after each iteration for each of the three cases. Note in all cases the highest bit-rate is always the maximum estimated bit-rate for a group of pictures, and the highest bit-rate used with the lower segment of the estimated cumulative frequency curve is always the original encoding bit-rate.

| Case 1: Three constant bit-rate levels for the first segment and one for the second: | | | | | | |
|---|---|---|---|---|---|---|
| | Initial settings | | After 1 iteration | | After 2 iterations | |
| | Bit-rate | Area | Bit-rate | Area | Bit-rate | Area |
| Area 1 | 674 | 261 | 728 | 369 | 768 | 463 |
| Area 2 | 1015 | 356 | 1210 | 558 | 1241 | 496 |
| Area 3 | 2000 | 1057 | 2000 | 558 | 2000 | 496 |
| Area 4 | 5768 | 2756 | 5768 | 2756 | 5768 | 2756 |
| Total | | 4430 | | 4241 | | 4211 |
| % Saved | | 0.00 | | 4.25 | | 4.95 |

| Case 2: Two constant bit-rate levels for each segment: | | | | | | | | |
|---|---|---|---|---|---|---|---|---|
| | Initial settings | | After 1 iteration | | After 2 iterations | | After 3 iterations | |
| | Bit-rate | Area | Bit-rate | Area | Bit-rate | Area | Bit-rate | Area |
| Area 1 | 806 | 561 | 944 | 984 | 990 | 1143 | 991 | 1145 |
| Area 2 | 2000 | 2049 | 2000 | 1306 | 2000 | 1146 | 2000 | 1145 |
| Area 3 | 2388 | 92 | 2629 | 216 | 2755 | 297 | 2802 | 329 |
| Area 4 | 5768 | 1230 | 5768 | 662 | 5768 | 441 | 5768 | 369 |
| Total | | 3932 | | 3168 | | 3027 | | 2988 |
| % Saved | | 0.00 | | 19.42 | | 23.03 | | 24.03 |

| Case 3: One constant bit-rate level for the first segment and three for the second: | | | | | | | | |
|---|---|---|---|---|---|---|---|---|
| | Initial settings | | After 1 iteration | | After 2 iterations | | After 3 iterations | |
| | Bit-rate | Area | Bit-rate | Area | Bit-rate | Area | Bit-rate | Area |
| Area 1 | 2000 | 5848 | 2000 | 5848 | 2000 | 5848 | 2000 | 5848 |
| Area 2 | 2227 | 34 | 2088 | 6 | 2262 | 44 | 2416 | 104 |
| Area 3 | 2568 | 51 | 2878 | 284 | 3004 | 192 | 3093 | 143 |
| Area 4 | 5768 | 766 | 5768 | 285 | 5768 | 192 | 5768 | 143 |
| Total | | 6699 | | 6423 | | 6276 | | 6238 |
| % Saved | | 0.00 | | 4.10 | | 6.27 | | 6.85 |

We observe that Case 2 converges to the lowest total area, and hence the best solution is to have two constant bit-rate levels above the original encoding rate and two not greater than it, noting that one of the latter will be the original encoding rate.

We also note that in fact there was no need to iterate with Case 3 if the cases were considered in increasing numerical order, as the area associated with the lower segment of the estimated cumulative frequency curve is greater than the total area of Case 2, even before iteration is applied in that case, and hence Case 3 could never be better than Case 2 as no changes are made for the lower segment in Case 3.

Figure 11:
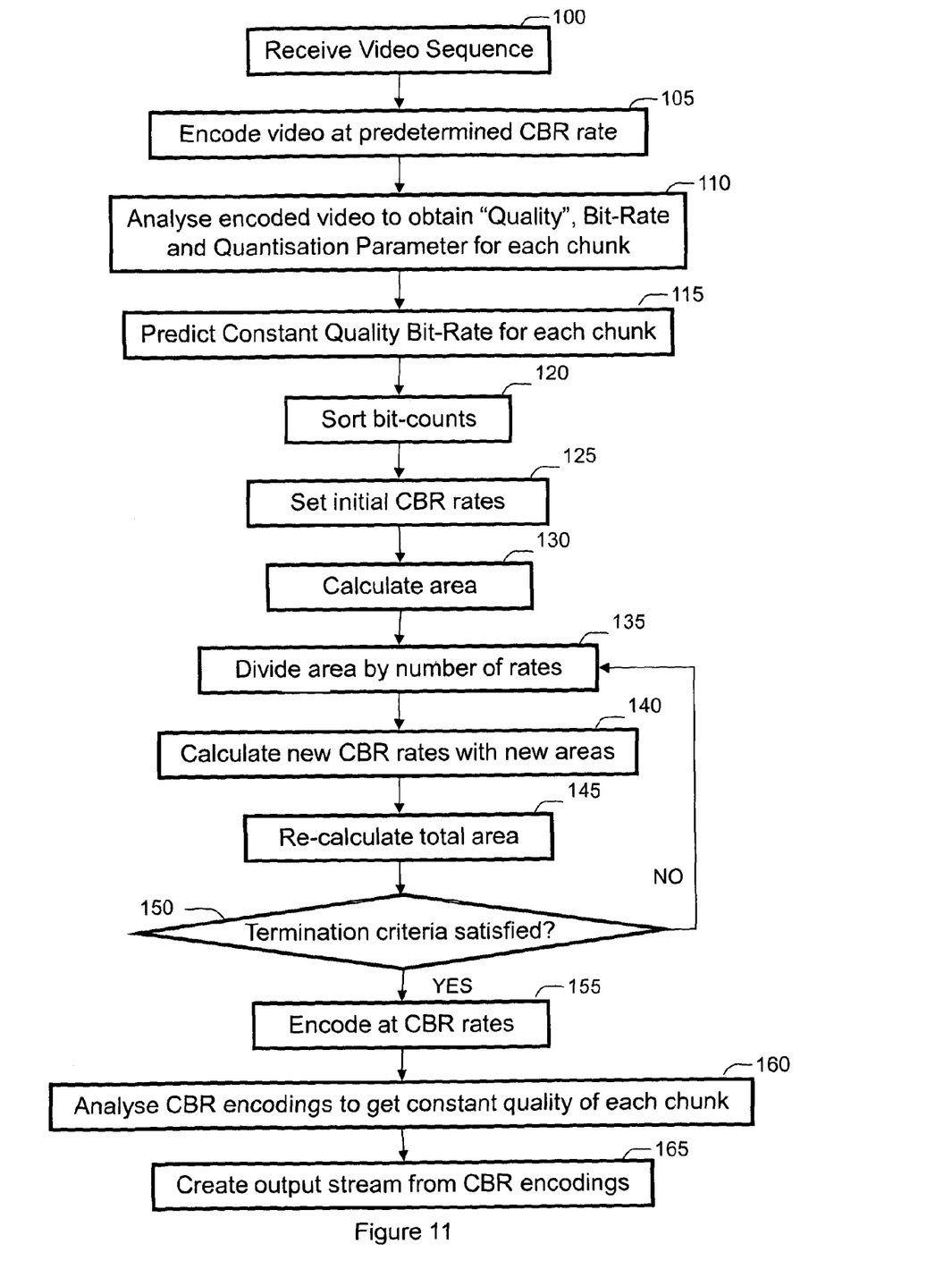
FIG. 11 is a flowchart explaining the operation of a coder such as that shown in FIG. 1 when performing a method according to a preferred embodiment of the invention.

FIG. 11 is a flowchart explaining the operation of a coder such as that shown in FIG. 1 performing a method according to a preferred embodiment. With reference to FIG. 11, a video sequence to be encoded is received (Step 100) at the input 2 of the video interface 1 of the apparatus of FIG. 1, for example. The sequence may be received as a stream of digitally-coded video frames or as a file. The sequence is initially coded using a convenient constant bit-rate (CBR) encoding rate (Step 105). The encoded sequence is then divided into chunks of video, and the respective chunks are then analysed (Step 110) in order to determine what constant bit-rate they would need to be encoded at in order to satisfy a target perceptual quality level (Step 115). At this point, it would be possible for a graph such as that shown in FIG. 2 to be drawn, by sorting the bit-counts so-determined (Step 120), and for a graph such as that shown in FIG. 3 to be drawn by partitioning the range of constant bit-rates so-determined into four (or whatever number is chosen) sub-ranges, bounded by what can be regarded as the initial (i.e. pre-iteration) constant bit-rates (Step 125). This may be done by partitioning the plot into four equal sections along its x-axis, or in various other ways.

As explained earlier, for a chunk of video represented at any point along the x-axis of FIG. 3, the vertical distance above the constant-quality curve and below the stepped dotted-line at that point represents the additional bit-rate required for constant quality encoding that would be 'wasted' because it would result in the particular chunk of video being encoded at an unnecessarily high quality (i.e. above the target quality but such that the increase in quality can be deemed not to result in an appreciable overall perceptual quality). Referring back to the graphs of FIGS. 3, 4 and 5, the next stage of the process involves performing iterations in order to reduce the total amount of additional bit-rate that would be 'wasted' in this way, without needing to partition the curve into any more than the chosen number (i.e. in this case, four) of constant bit-rate sub-ranges.

As the constant-quality cumulative frequency curve will in general be an irregularly stretched S-shaped curve, the initial settings (partitions equally spaced along the x-axis) will in general result in the area fraction at the right end of the graph being significantly larger than the others. By re-positioning the partitions such as to reduce this largest area fraction, the other area fractions are likely to increase, but by significantly less than the decrease in the largest area fraction. The total area (i.e. the sum of the area fractions) may thus be reduced with each of a succession of iterations.

Steps 130 to 150 of FIG. 11 represent how this may be done. In Step 130, the total area (with the partitions in the positions they would be in given the initial settings, as in FIG. 3) is calculated. In Step 135, this total area is divided by the chosen number (i.e. in this case, four), then in Step 140, the partitions are re-positioned such that the area of the (previously large) right-hand area is only a quarter of the previous total area. The total area is then re-calculated in Step 145 (i.e. with re-positioned partitions as shown in FIG. 4). At Step 150, a determination is made as to whether predetermined termination conditions such as those discussed earlier have been met. If not, a further iteration may be performed by repeating Steps 135, 140 and 145 before re-checking the result against the termination conditions at Step 150. If the termination conditions are met, the process may continue on to the next stage.

Creation of a Near-Constant Quality Video Bitstream from Constant Bit-Rate Video Bitstreams We have described above, with reference in particular to steps 100 to 150 of FIG. 11, how constant bit-rate levels at which to encode video may be selected such that it is possible to select chunks from each bitstream to create a video bitstream in which all chunks are coded at a target quality or higher, while tending to minimise the size of the created video bitstream.

Having selected these constant bit-rate levels, the video content (the whole sequence, or respective portions thereof, as necessary) is then encoded at constant bit-rate at these selected levels (Step 155), unless such encoding has already been performed. The constant bit-rate encoded video bitstreams are then analysed (Step 160) to determine a quality metric, as described above, for each group of pictures. We then create a new video bitstream (Step 165) by, for each group of pictures in the video content in turn, selecting the bits from the lowest bit-rate video bitstream that has been encoded at the target quality or higher, or the bits from the highest bit-rate video bitstream in the case that the target quality has not been achieved in any encoding.

This process for the final step (Step 165) of FIG. 11 can be carried out as specified in the explanatory flowchart steps set out below, starting at step 200.

200 The source video content that has been encoded at the selected constant bit-rate levels, $L_r$, (r=1 ... R) is divided into chunks, g, (g=1 ... G), typically groups of pictures starting with an Intra coded picture, and for each chunk of each encoded video stream, the Perceptual Quality Qrg is determined.

210 Target Quality Qt is set to the target quality for the output near-constant quality encoded bitstream file.

220 Set chunk index g=1.

230 Set bit-rate index r=0.

240 Set r=r+1

250 If ($Q_{rg} \leq Q_T$) and (r<R) Go to step 240

260 Set the bit-rate index of the output bitstream file for chunk g, $F_g$=r.

270 Set g=g+1. If g≤G Go to step 230 else Finish

It will of course be evident that the eventual process of creating a final near-constant quality video bitstream using temporal portions (or "chunks") of video content taken from a plurality of constant bit-rate video bitstreams, each having different bit-rates (having chosen these in a manner such as that described earlier) may be performed according to the above flowchart steps or in a variety of other manners.

The invention claimed is:

1. A method of video coding, comprising:
   (a) obtaining a video sequence encoded at one or more initial constant bit-rates, the one or more initial constant bit-rates being in a range;
   (b) dividing the encoded video sequence into temporal portions;
   (c) analysing respective temporal portions whereby to determine, in respect of each of a plurality of said temporal portions, a constant bit-rate at which said temporal portion could be encoded to meet a predetermined perceptual quality requirement;

(d) partitioning the range of constant bit-rates so-determined into a plurality of sub-ranges, each sub-range having a selected one of a plurality of different bit-rates associated therewith;

(e) assigning respective temporal portions to one of said sub-ranges such that said temporal portions, if encoded at the bit-rate associated with the sub-range to which they are assigned, would meet said predetermined perceptual quality requirement;

(f) establishing, in respect of said sequence, a first bit-count measure indicative of an amount of data that would be required for said temporal portions to be encoded respectively at the bit-rates of the sub-ranges to which they have been assigned, and a second bit-count measure indicative of an amount of data that would be required for said temporal portions each to be encoded at bit-rates sufficient to match a constant perceptual quality requirement;

(g) determining a difference measure indicative of a level of disparity between said first bit-count measure and said second bit-count measure;

(h) re-partitioning the range of constant bit-rates at least once using an updated set of bit-rates such that at least one sub-range has a different bit-rate associated therewith, said updated set of bit-rates being such that a subsequent performance of steps (e), (f) and (g) would result in determination of a difference measure indicative of a decrease in said disparity; and (i) creating an output video sequence comprising temporal portions respectively encoded at different bit-rates from said updated set of bit-rates.

2. A method according to claim 1, wherein the video sequence obtained is initially encoded at a predetermined initial constant bit-rate.

3. A method according to claim 1, wherein the video sequence obtained is initially encoded at a maximum rate at which content may be encoded for a given video service.

4. A method according to claim 1, wherein respective portions of the video sequence obtained are identified as having different characteristics, and are encoded at different initial constant bit-rates, the initial bit-rates for respective portions being determined in dependence on the respective characteristics identified in respect thereof.

5. A method according to claim 1, wherein the or each step of re-partitioning the range of constant bit-rates is performed such that the updated set of bit-rates includes at least one of said one or more initial constant bit-rates.

6. A method according to claim 5, wherein re-partitioning the range of constant bit-rates comprises a step of identifying an optimal number of sub-ranges having bit-rates greater than said at least one initial constant bit-rate associated therewith, and an optimal number of sub-ranges having bit-rates lower than said at least one initial constant bit-rate associated therewith.

7. A method according to claim 1, wherein the number of constant bit-rates used for encoding is between two and ten, and is preferably four.

8. A method according to claim 1, wherein re-partitioning the range of constant bit-rates may involve partitioning the range of constant bit-rates into a different number of sub-ranges, each sub-range having a selected one of a plurality of different bit-rates associated therewith.

9. A method according to claim 1, wherein the constant bit-rates used for encoding are limited by a predetermined maximum bit-rate.

10. An apparatus comprising: a computer processing system, comprising a computer processor, the computer processing system being configured to:
(a) obtain a video sequence encoded at one or more initial constant bit-rates, the one or more initial constant bit-rates being in a range;
(b) divide the encoded video sequence into temporal portions;
(c) analyze respective temporal portions whereby to determine, in respect of each of a plurality of said temporal portions, a constant bit-rate at which said temporal portion could be encoded to meet a predetermined perceptual quality requirement;
(d) partition the range of constant bit rates so determined into a plurality of sub-ranges; each sub-range having a selected one of a plurality of different bit rates associated therewith;
(e) assign respective temporal portions to one of said sub-ranges such that said temporal portions if encoded at the bit rate associated with the sub-range to which they are assigned, would meet said predetermined perceptual quality requirement;
(f) establish, in respect of said sequence, a first bit-count measure indicative of an amount of data that would be required for said temporal portions to be encoded respectively at the bit-rates of the sub-ranges to which they have been assigned, and a second bit-count measure indicative of an amount of data that would be required for said temporal portions each to be encoded at bit rates sufficient to match a constant perceptual quality requirement;
(g) determine a difference measure indicative of a level of disparity between said first bit-count measure and said second bit-count measure;
(h) re-partition the range of constant bit rates at least once using an updated set of bit-rates such that at least one sub-range has a different bit rat associated therewith, said updated set of bit-rates being such that a subsequent performance of steps (e), (f) and (g) would result in determination of a difference measure indicative of a decrease in said disparity; and
(i) create an output video sequence comprising temporal portions respectively encoded at different bit-rates from said updated set of bit-rates.

11. A non-transitory computer-readable medium carrying processor implementable instructions, which upon execution of by computer system perform steps of video encoding comprising:
(a) obtaining a video sequence encoded at one or more initial constant bit-rates, the one or more initial constant bit-rates being in a range;
(b) dividing the encoded video sequence into temporal portions;
(c) sing respective temporal portions whereby to determine, in respect of each of a plurality of said temporal portions, a constant bit-rate at which said temporal portion could be encoded to meet a predetermined perceptual quality requirement;
(d) partitioning the range of constant bit-rates so determined into a plurality of sub-ranges, each sub-range having a selected one of a plurality of different bit-rates associated therewith;
(e) assigning second respective temporal portions to one of said sub-ranges such that said temporal portions, if encoded at the bit-rate associated with the sub range to which they are assigned, would meet said predetermined perceptual quality requirement;

(f) establishing, in respect of said sequence, a first bit count measure indicative of an amount of data that would be required for said temporal portions to be encoded respectively at the bit rates of the sub ranges to which they have been assigned, and a second bit-count measure indicative of an amount of data that would be required for said temporal portions each to be encoded at bit rates sufficient to match a constant perceptual quality requirement;

(g) determining a difference measure indicative of a level of disparity between said first bit-count measure and second bit-count measure;

(h) re-partitioning the range of constant bit-rates at least once using an updated set of bit-rates such that at least one sub-range has a different bit-rate associated therewith, said updated set of bit-rates being such that a subsequent performance of steps, (e), (f) and (g) would result in a determination of a difference measure indicative of a decrease in said disparity; and (i) creating an output video sequence comprising temporal portions respectively encoded at different bit-rates from said updated set of bit-rates.

* * * * *